United States Patent
Johnston

(10) Patent No.: US 6,594,943 B1
(45) Date of Patent: Jul. 22, 2003

(54) FISHING LINE TWIST REMOVAL APPARATUS AND METHOD

(75) Inventor: William R. Johnston, Pocahontas, AR (US)

(73) Assignee: Line Twist Solutions, Inc., Pocahontas, AR (US)

(*) Notice: Subject to any disclaimer, the term of this patent is extended or adjusted under 35 U.S.C. 154(b) by 0 days.

(21) Appl. No.: 09/928,809

(22) Filed: Aug. 13, 2001

(51) Int. Cl.[7] ............................................... A01K 91/06
(52) U.S. Cl. ..................................... 43/43.13; 43/4.5
(58) Field of Search ............................. 43/43.12, 43.13, 43/4.5, 42.12, 42.2, 44.9, 44.91

(56) References Cited

U.S. PATENT DOCUMENTS

| | | | |
|---|---|---|---|
| 2,003,245 A | | 3/1935 | Carey ............................ 117/1 |
| 2,563,386 A | * | 8/1951 | Wight, Jr. .................. 43/42.22 |
| 2,591,558 A | * | 4/1952 | Kramer ....................... 43/44.9 |
| 2,683,323 A | * | 7/1954 | Dudley ...................... 43/42.25 |
| 2,749,648 A | * | 6/1956 | Schneider ....................... 43/17 |
| 2,926,452 A | * | 3/1960 | Lewis ....................... 114/221 R |
| 2,967,372 A | | 1/1961 | Pass et al. ................. 43/43.13 |
| 2,977,707 A | * | 4/1961 | Dreher ....................... 43/42.12 |
| 3,145,498 A | | 8/1964 | Kochis ....................... 43/43.13 |
| 3,156,065 A | | 11/1964 | Klammer .................... 43/43.13 |
| 3,224,134 A | * | 12/1965 | Holcombe ..................... 43/57.1 |
| 3,440,756 A | * | 4/1969 | Leadbetter ................. 43/42.06 |
| 3,971,153 A | | 7/1976 | Harms ....................... 43/43.13 |
| 4,021,959 A | * | 5/1977 | Antkowiak ...................... 43/41 |
| 5,094,026 A | * | 3/1992 | Correll et al. ............. 43/42.11 |
| 5,167,088 A | * | 12/1992 | Wardall ...................... 43/42.03 |
| 5,263,277 A | | 11/1993 | Kelly ........................ 43/43.13 |

FOREIGN PATENT DOCUMENTS

| | | | |
|---|---|---|---|
| JP | 01141537 A | * | 6/1989 |
| JP | 11018652 A | * | 1/1999 |

* cited by examiner

*Primary Examiner*—Peter M. Poon
*Assistant Examiner*—Tara M Golba
(74) *Attorney, Agent, or Firm*—Walker,McKenzie & Walker,PC

(57) ABSTRACT

A fishing line twist removal apparatus for removing accumulated twist from a fishing line while a fishing lure is secured to the fishing line. The lure is placed into a container body having a cavity, and a slitted cap entraps the lure into the container with the fishing line extending through the slit. A plurality of blades extending outward from the container body cause the apparatus to rotate as it is pulled through water. The blades may angle for clockwise or counterclockwise rotation. A blunt nose on the apparatus allows it to skip or skim the surface of the water for reduced rotation, thereby avoiding excessive twist removal and reverse direction overtwist.

1 Claim, 1 Drawing Sheet

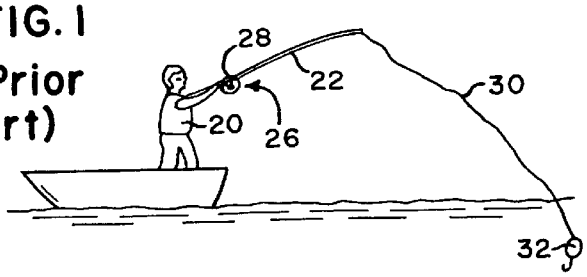
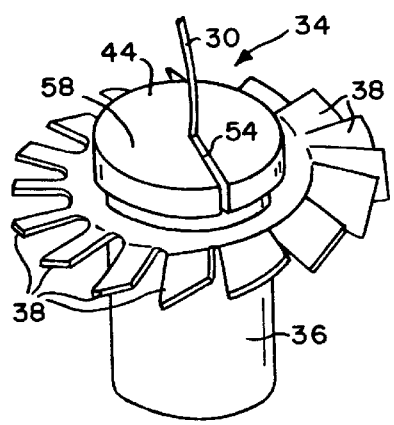
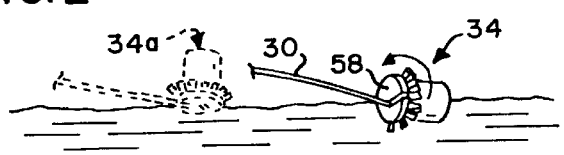
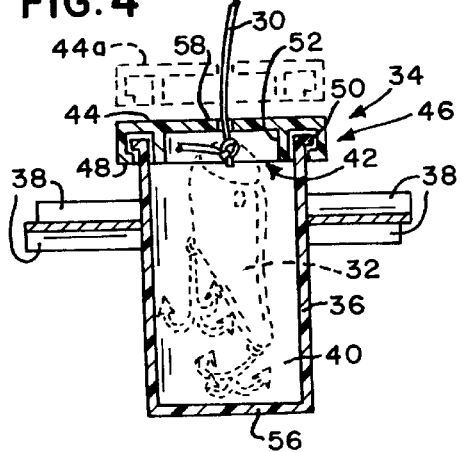
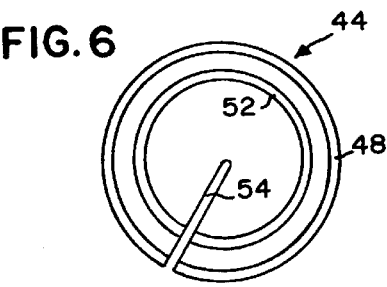
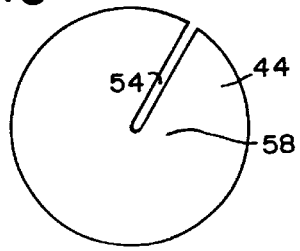
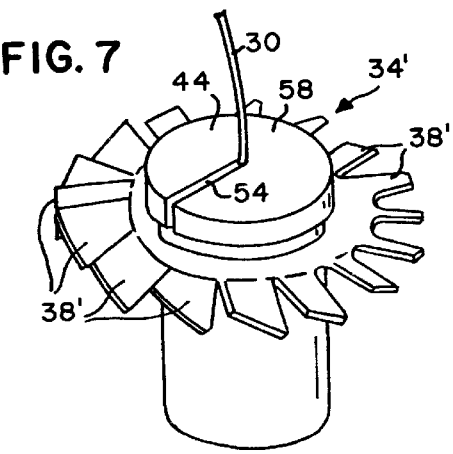

FISHING LINE TWIST REMOVAL APPARATUS AND METHOD

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO COMPACT DISC(S)

Not applicable.

BACKGROUND OF THE INVENTION

1. Field of the Invention

The present invention relates, in general, to the sport of fishing, and in particular, to apparatus and methods for removing the twist in twisted fishing line.

2. Information Disclosure Statement

Those who enjoy the sport of fishing with rods and reels have often encountered tangled and twisted fishing lines, and such twisting of the fishing line is a natural by-product of the use of well-known fishing reels having a spool member onto which the fishing line is wound. Typically, a well-known manual crank is used to operate a mechanism that winds the fishing line onto the spool member. With some versions of fishing reels, the manual crank causes the spool member to rotate, thereby causing the fishing line to become wound onto the spool of the reel. With other versions of fishing reels, commonly known as "spinning reels", a bail member revolves around a non-rotating spool member in response to operation of the manual crank, and the bail member winds the fishing line around the non-rotating spool. As a lure attached to the end of the fishing line is cast and retrieved, the winding and unwinding of the fishing line around the spool of the fishing reel causes the line to be twisted in either a clockwise or counter-clockwise direction, depending on the specific structure of the fishing reel, and additional line twisting may occur due to rotation of the lure as it is retrieved through the water. It should be understood that twisting of the fishing line is most prevalent and severe when spinning reels are used, but some limited twisting of the fishing line can also occur because of the structure of other types of fishing reels as well. Various fishing habits and techniques of individual fishermen may also contribute to the direction of accumulated line twist. Twisted fishing line reduces the enjoyment of fishing and causes difficulties in casting and retrieving a lure attached to the fishing line, causes excessive fishing line wear and breakage, and causes entanglement and knotting of the fishing line. Often, a length of twisted fishing line is simply cut from the spool and discarded.

It is therefore desirable to have apparatus and methods for quickly and easily removing the twist in fishing line without requiring removal of the fishing lure from the fishing line and without requiring discarding a portion of twisted fishing line.

A preliminary patentability search in Class 43, subclass 43.13, produced the following patents, some of which may be relevant to the present invention: Carey, U.S. Pat. No. 2,003,245, issued May 28, 1935; Pass et al., U.S. Pat. No. 2,967,372, issued Jan. 10, 1961; Kochis, U.S. Pat. No. 3,145,498, issued Aug. 25, 1964; Klammer, U.S. Pat. No. 3,156,065, issued Nov. 10, 1964; and Kelly, U.S. Pat. No. 5,263,277, issued Nov. 23, 1993.

Carey, U.S. Pat. No. 2,003,245, describes a lure replacement having a plurality of outwardly-bent blades, and the lure replacement device is used to restore the "lay" or normal twist to a textile fishing line. A fishing lure is removed from the line and replaced by the Carey lure replacement device, which is then trolled through the water or cast and retrieved through the water, with the blades causing the lure replacement to spin about its axis and thereby restore the "lay" or normal twist to the fishing line. Once the normal twist of the line has been restored, the lure replacement device is removed and the lure is replaced, and fishing continues.

Pass et al., U.S. Pat. No. 2,967,372, discloses a spiral helix that is attached to a fishing line and then towed, or cast and retrieved, through water to untwist the fishing line. At column 2, line 45, Pass teaches that it is necessary to remove the fishing lure and replace the fishing lure with the spiral helix device in order to untwist a fishing line.

Kochis, U.S. Pat. No. 3,145,498, discloses a device having a pair of vanes that intersect in an X-shaped configuration. The device replaces a fishing lure on the end of twisted fishing line, and is trolled through a body of water to untwist the fishing line.

Klammer, U.S. Pat. No. 3,156,065, discloses a device having a pair of angled wings that cause the device to rotate about its axis as it is pulled through the water at the end of a twisted fishing line. Like earlier prior art, the device replaces a fishing lure at the end of the twisted fishing line.

Kelly, U.S. Pat. No. 5,263,277, discloses various devices for untwisting fishing lines. Some devices have angled propeller-type blades, others have a helical screw that encircles the device, and others have internal angled blades. The various configurations of blades cause the device to rotate as it is pulled through the water at the end of a fishing line. A common feature of all of the devices is that a swivel is provided on the remote end of the device for attaching a hook, so that the untwisting device becomes a part of the fishing lure and is interposed between the hook and the fishing line so as to prevent twisting of the line while attracting fish.

Additionally, Harms, U.S. Pat. No. 3,971,153, issued Jul. 27, 1976, discloses a finned spherical device for attachment to the end of twisted fishing line. Like earlier prior art, the device replaces a fishing lure at the end of the twisted fishing line.

None of these references, either singly or in combination, disclose or suggest the present invention.

BRIEF SUMMARY OF THE INVENTION

The present invention is a fishing line twist removal apparatus for removing accumulated twist from a fishing line while a fishing lure is secured to the fishing line. The lure is placed into a container body having a cavity, and preferably a slitted cap entraps the lure into the container with the fishing line being received into and passing through the slit. A plurality of blades extending outward from the container body cause the apparatus to rotate as it is pulled through water. The blades may angle for clockwise or counter-clockwise rotation, as may be required for the specific direction of twist to be removed. A blunt nose on the apparatus allows it to skip or skim the surface of the water for reduced rotation, thereby avoiding excessive twist removal and reverse direction overtwist.

It is an object of the present invention to provide a method and apparatus for quickly and easily removing accumulated twist from a fishing line without having to remove a fishing lure from the fishing line. It is a further object of the present invention to allow a fisherman to avoid excessive untwisting of the fishing line while practicing the method of the invention.

BRIEF DESCRIPTION OF THE SEVERAL VIEWS OF THE DRAWING

FIG. 1 is a representative view of the prior art showing a fisherman casting a lure into a body of water.

FIG. 2 is a perspective view showing a first embodiment of the present invention being used to untwist a fishing line.

FIG. 3 is a perspective view of the first embodiment of the present invention.

FIG. 4 is a side sectional view of the first embodiment of the present invention taken along a diameter thereof, with a fishing lure shown thereinside.

FIG. 5 is a top view of a preferred cap of the first and second embodiments of the present invention.

FIG. 6 is a bottom view of a preferred cap of the first and second embodiments of the present invention.

FIG. 7 is a perspective view of a second embodiment of the present invention in which the blades are reversed from those of the first embodiment.

DETAILED DESCRIPTION OF THE INVENTION

FIG. 1 shows a fisherman 20 fishing in the well-known manner of the prior art using a well-known fishing rod 22 to which a well-known fishing reel 26 is attached, and fishing reel 26 has a well-known spool member 28 onto which a fishing line 30 is wound in a manner well-known to those skilled in the art. Typically, a well-known manual crank (not shown) is used to operate a well-known mechanism that winds fishing line 30 onto spool member 28. With some well-known versions of fishing reels 26, the manual crank causes the spool member 28 to rotate, thereby causing fishing line 30 to become wound onto the spool 28 of the reel 26. With other versions of fishing reels 26, commonly known as "spinning reels", a well-known bail member (not shown) revolves around a non-rotating spool member in response to operation of the manual crank, and the bail member thereby winds fishing line 30 around the non-rotating spool. As a lure 32 attached to the end of fishing line 30 is cast and retrieved in a manner well-known to those skilled in the art, the winding and unwinding of fishing line 30 around spool 28 of fishing reel 26 causes fishing line 30 to become twisted in either a clockwise or counter-clockwise direction, depending on the specific structure of fishing reel 26, and additional line twisting may occur due to rotation of lure 32 as it is retrieved through the water. It should be understood that twisting of the fishing line 30 is most prevalent and severe when spinning reels are used, but some limited twisting of the fishing line can also occur because of the structure of other types of fishing reels as well. Various fishing habits and techniques of individual fishermen may also contribute to the direction of accumulated line twist.

Referring to FIGS. 2–6, a first embodiment of a fishing line twist removal apparatus 34 is seen to comprise a container body 36 adapted for receiving fishing lure 32 thereinside while fishing lure 32 remains attached to fishing line 30 with fishing line 30 extending outside container body 36, and a plurality of angled blades 38 extending outwardly from container body 36 with blades 38 being adapted for being acted upon by a body of water into which twist removal apparatus 34 has been placed.

Container body 36 is preferably substantially cylindrically-symmetric about a center axis, and a substantially cylindrical cavity 40 is formed by container body 36 thereinside, with container body 36 further having a substantially axially-aligned mouth opening 42 into cavity 40 through which fishing lure 32 may pass into and out of cavity 40. The preferred cylindrically-symmetric outer shape of container body 36 offers the least resistance to a spinning or revolving of twist removal apparatus 34 about its axis as it is moved relative to a body of water in a manner hereinafter described in detail.

Twist removal apparatus 34 preferably includes a cap 44 for selectably covering and uncovering mouth opening 42 of container body 36, with twist removal apparatus 34 including cap engaging means 46 for securing cap 44 into position covering mouth opening 42. Cap engaging means 46 may include well-known mating tab and slot interlocking portions (not shown) on container body 36 adjacent mouth opening 42 and also on cap 44 that matingly secure cap 44 over mouth opening 42 when cap 44 is twistingly secured onto container body 36, or preferably cap engaging means 46 instead includes a deformable lip 48, preferably circumferential about the underside of cap 44, that engages with a mating ridge 50 of container body 36, with ridge 50 being preferably circumferential about container body 36 adjacent mouth opening 42 so that cap 44 may be securely "snap fit" onto container body 36 covering mouth opening 42 as shown in FIGS. 2–4, and then selectably removed, as shown by dotted outline reference numeral 44a in FIG. 4, simply by deforming a portion of lip 48 so that lip 48 no longer engages ridge 50. Preferably, cap 44 may include a cylindrical wall 52 that extends into mouth opening 42 adjacent container body 36 so as to align cap 44 onto container body 36.

Cap 44 preferably has a slit 54 extending from its axis of cylindrical symmetry to the perimeter and through lip 48, with slit 54 being adapted for receiving fishing line 30 thereinto so that, once lure 32 has been placed into cavity 40 with fishing line 30 still attached to lure 32 and extending outside cavity 40 through mouth opening 42, fishing line 30 may be received into slit 54 and then cap 44 may be secured over mouth opening 42, thereby entrapping fishing lure 32 inside container body 36 within cavity 40. It should be understood that the width of slit 54 is shown exaggerated in the drawings for purposes of illustration only, and that preferably slit 54 is constructed as a "knife-thin" slit without removal of material from cap 44 so that the edges of slit 54 seal together and against fishing line 30, thereby preserving a substantially watertight seal so that water will not enter cavity 40, thereby preserving the substantial buoyancy of twist removal apparatus 34 and allowing twist removal apparatus 34, with lure 32 therewithin, to float upon the surface of the water for ease of retrieval and with rapid rotation of twist removal apparatus 34 as it rotates with container body 36 substantially above, rather than below, the surface of the water in a manner hereinafter described. Container body 36 preferably has a bottom 56 sealing cavity 40 so that fishing lure 32 is held within cavity 40 with water being sealed from cavity 40, thereby preserving the buoyancy of twist removal apparatus 34, although it should be understood that, when twist removal apparatus 34 is used in the manner hereinafter described, the pulling forces on fishing line 30 will typically cause fishing lure 32 to abut the underside of cap 44.

Although twist removal apparatus 34 may be constructed of various materials, a flexible plastic is preferred for container body 36 and cap 44 for ease of manufacturing by a molding process and for light weight. Blades 38 may be integrally molded with container body 36 or may be constructed from a metal collar using a metal such as aluminum or the like.

Twist removal apparatus 34 preferably has a blunt nose portion 58 through which fishing line 30 extends outside container body 36 while fishing lure 32 is entrappingly received inside container body 36. Preferably, the blunt nose portion 58 of twist removal apparatus 34 is a structural element of cap 44, with slit 54 being into and through blunt nose portion 58. Blunt nose portion 58 permits the fisherman 20 to avoid excessive opposite-direction untwisting by twist removal apparatus 34, in a manner that will be described hereinafter.

To practice the method of the present invention, a fishing lure 32 is placed into cavity 40 of container body 36, fishing line 30 is received into slit 54, and cap 44 is secured over the mouth opening 42, thereby entrapping fishing lure 32 within container body 36. The twist removal apparatus, with fishing lure 32 thereinside, is placed into a body of water as shown in solid outline in FIG. 2 as reference numeral 34, and the twist removal apparatus is then caused to move relative to the body of water by exerting a pulling force on fishing line 30, whether by trolling the twist removal apparatus behind a moving boat or by having the fisherman 20 retrieve the twist removal apparatus by reeling in the fishing line onto reel 26. As the water forcefully acts upon the angled blades 38 the twist removal apparatus is caused to rapidly rotate or spin about the axis of the fishing line 30, thereby removing accumulated twist in the fishing line. As hereinbefore described, the preferred structure of twist removal apparatus 34 is such that container body 36 is substantially watertight, with water being prevented from entry thereinside so that twist removal apparatus is substantially buoyant with lure 32 thereinside, thereby causing twist removal apparatus 34 to not become substantially submerged in the water, thereby causing fishing line 30 to also not be submerged as the twist removal apparatus is trolled or retrieved by the fisherman, thereby causing the untwisting of fishing line 30 to be substantially uniform all the way from the lure 32 to the fishing rod 22 of fisherman 20. Even though the preferred buoyancy of container body 36 causes twist removal apparatus 34 to not be substantially submerged, some of blades 38, namely, those extending downwardly at each instant during rotation, will be acted upon by the body of water and cause the twist removal apparatus 34 to rotate as desired. For efficiency in use of the twist removal apparatus, the number of blades 38 and their angle and shape is preferably selected so that a large number of revolutions of the twist removal apparatus is produced per foot of water through which the twist removal apparatus passes. The blunt nose portion 58 of the twist removal apparatus permits the fisherman to control the amount of twist removal without excessive opposite-direction untwisting. Specifically, the fisherman 20 first causes the twist removal apparatus 34 to move with respect to the water with some blades extending into the water, as shown in solid outline in FIG. 2, by exerting first.pulling force on the fishing line 30. Then, by increasing the amount of pulling force on the fishing line 30 to a certain second pulling force, the blunt nose portion 58 acts upon the body of water moving therepast to cause the twist removal apparatus and its blades to rise substantially above the surface of the water, as shown in dotted outline as reference numeral 34a in FIG. 2, and the twist removal apparatus can then be caused to "skip" and "ski" across the water with the blades 38 being substantially above the water and with the blunt nose portion 58 acting much like a plane or ski upon which the twist removal apparatus skips and glides over the surface of the water, so that the line 30 may be reeled rapidly, and the twist removal apparatus may be caused to be rapidly retrieved, thereby greatly reducing the number of revolutions of twist removal apparatus per distance of retrieval. In this manner, excessive untwisting can be avoided, and the fisherman is not required to move his boat toward the twist removal apparatus in order to prevent excessive untwisting of the fishing line.

A second embodiment 34' of the present invention is shown in FIG. 7. It shall be understood that most aspects of both embodiments are substantially the same, and only the differences will be treated in detail, it being understood that similar structural features of both embodiments perform similar functions. The only difference between the first and second embodiments is that the second embodiment 34' has blades 38' that are angled in a reverse direction from the blades 38 of the first embodiment 34, thereby causing the second embodiment 34 to rotate in a clockwise direction as viewed by the fisherman, as compared to the counter-clockwise rotation heretofore described for the first embodiment 34. It is believed, because most fishing reels 26 have been found to cause a counter-clockwise twist to the fishing line 30, that the second embodiment 34' will be the more commonly-used version of the first and second embodiments of the present invention. It should be understood that both embodiments of the present invention may be separately provided with blades 38 and 38' being integral with their respective embodiments, or else both blades 38 and 38' may be provided together with a single container body 36 onto which one of blades 38 or 38' may be slidably and frictionally selectably received so that a single container body 36 may be utilized, with appropriate choice of blades 38, 38', to untwist a twisted line in either the counter-clockwise or clockwise direction, as desired, in a manner that will now be apparent.

It should be understood that various shapes of blades or equivalent fins, vanes, etc., may be used to cause twist removal apparatus 34 to rotate as the twist removal apparatus 34 is caused to move relative to the body of water in the manner heretofore described. Furthermore, the shape of container body 36, while preferably cylindrically symmetric as shown, may be varied as desired to accommodate differing sizes of lures and also for ornamental purposes.

Although the present invention has been described and illustrated with respect to a preferred embodiment and a preferred use therefor, it is not to be so limited since modifications and changes can be made therein which are within the full intended scope of the invention.

I claim:

1. A method for removing accumulated twist from a fishing line while a fishing lure is attached to the fishing line, said method comprising the steps of:

(a) providing a twist removal apparatus, said twist removal apparatus comprising:
   i. a container body having a cavity formed thereinside and adapted for receiving the fishing lure within said cavity while the fishing lure remains attached to the fishing line with the fishing line extending outside said container body;

ii. a blunt nose portion through which the fishing line extends outside said container body while the fishing lure is received within said cavity of said container body; and iii. a plurality of angled blades extending outwardly from said container body and adapted for being acted upon by a body of water into which said twist removal apparatus has been placed;

(b) placing the fishing lure, while attached to the fishing line, into said cavity;

(c) placing said twist removal apparatus into a body of water;

(d) causing said twist removal apparatus to move relative to the body of water by exerting a first pulling force on the fishing line so that the body of water acts upon said blades and thereby causes the twist removal apparatus to rotate; then, (e) exerting a second pulling force on the fishing line, said second pulling force being greater than said first pulling force, such that said blunt nose portion acts upon the body of water so as to cause said twist removal apparatus to rise substantially above an upper surface of the body of water and so as to cause said blunt nose to ski upon the surface with said twist removal apparatus substantially above the surface of the water such that said skiing of said blunt nose greatly reduces contact between said blades and said water and provides for retrieval of the twist removal apparatus and fishing lure thereinside at a reduced rate of rotation without over-rotating of the twist removal apparatus.

* * * * *